(12) United States Patent
Dieckröger

(10) Patent No.: US 6,975,795 B2
(45) Date of Patent: Dec. 13, 2005

(54) REFRACTIVE INDEX GRATING, AND MODE COUPLER HAVING A REFRACTIVE INDEX GRATING

(75) Inventor: Jens Dieckröger, München (DE)

(73) Assignee: Finisar Corporation, Sunnyvale, CA (US)

( * ) Notice: Subject to any disclaimer, the term of this patent is extended or adjusted under 35 U.S.C. 154(b) by 207 days.

(21) Appl. No.: 10/307,039

(22) Filed: Nov. 29, 2002

(65) Prior Publication Data

US 2004/0062481 A1 Apr. 1, 2004

(30) Foreign Application Priority Data

Sep. 30, 2002 (DE) ................. 102 46 547

(51) Int. Cl.[7] ................................ G02B 6/34
(52) U.S. Cl. ....................... 385/37; 385/129
(58) Field of Search ................. 385/15, 31, 37, 385/39, 40, 129–132

(56) References Cited

U.S. PATENT DOCUMENTS

| | | | |
|---|---|---|---|
| 6,671,439 B2 * | 12/2003 | Dieckroger | ................. 385/50 |
| 6,823,094 B2 * | 11/2004 | Goh et al. | ................. 385/14 |
| 2002/0025120 A1 | 2/2002 | Dieckroger | ................. 385/50 |
| 2003/0138209 A1 * | 7/2003 | Chan | ................. 385/37 |

FOREIGN PATENT DOCUMENTS

| | | | | |
|---|---|---|---|---|
| DE | 915511 A2 * | 5/1999 | ......... | H01L 23/34 |
| DE | 101 21 462 A1 | 11/2001 | ......... | G02B 27/44 |
| DE | 100 32 933 A1 | 1/2002 | ......... | 385/50 |
| EP | 1 193 515 A2 | 4/2002 | ......... | G02B 6/14 |
| WO | 00/52519 | 9/2000 | ......... | G02F 1/65 |
| WO | 02/44777 A1 | 6/2002 | ......... | 385/129 |

* cited by examiner

*Primary Examiner*—Frank G. Font
*Assistant Examiner*—Christopher M. Kalivoda
(74) *Attorney, Agent, or Firm*—Laurence A. Greenberg; Werner H. Stemer; Ralph E. Locher

(57) ABSTRACT

A refractive index grating has at least one configuration of heating elements on or adjacent to a wave-guiding structure. Regions are introduced into the wave-guiding structure and/or into an adjoining substrate, which regions have a higher thermo-optical coefficient or a lower thermal conductivity compared to the wave-guiding structure or the substrate. Substantially each heating element is assigned at least one of the regions with a higher thermo-optical coefficient and/or at least one region with a lower thermal conductivity. There is also provided a mode coupler with a refractive index grating of this type.

18 Claims, 4 Drawing Sheets

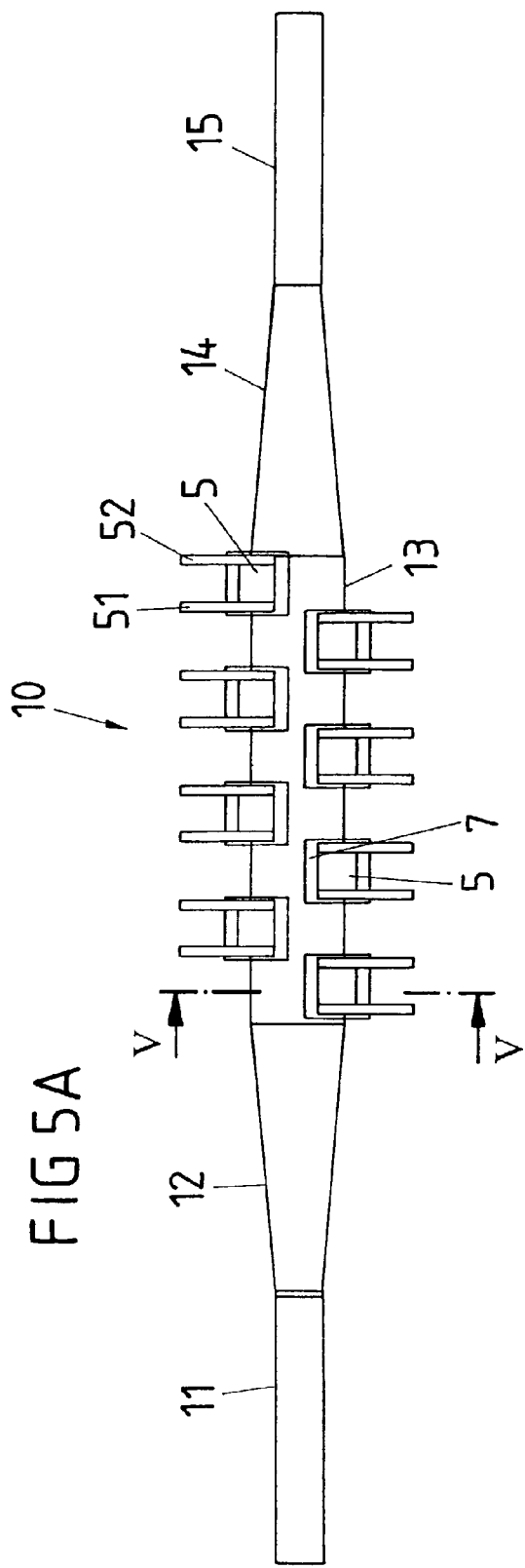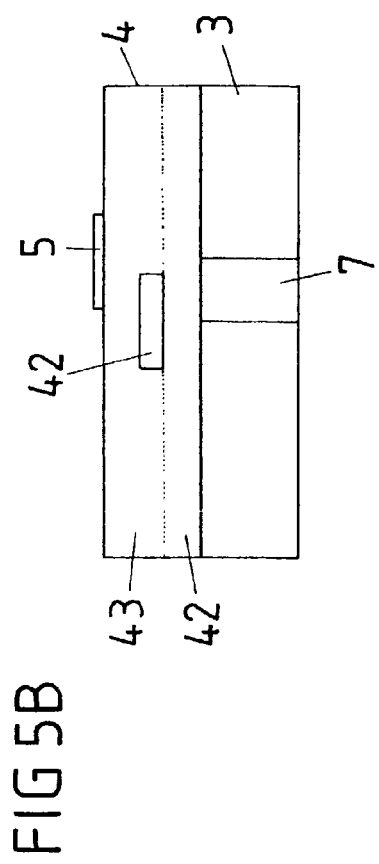
FIG 5A
FIG 5B

REFRACTIVE INDEX GRATING, AND MODE COUPLER HAVING A REFRACTIVE INDEX GRATING

BACKGROUND OF THE INVENTION

Field of the Invention

The invention relates to a refractive index grating having at least one configuration of heating elements on or adjacent to a wave-guiding structure, and to a mode coupler having a refractive index grating of this type.

It is known to design optical switches and adjustable attenuators as planar light circuits (PLCs). In this context, a preferred system of materials is glass on silicon ($SiO_2$/Si) Silicon dioxide (or silicon oxide, for short) $SiO_2$ waveguides are distinguished by low losses and efficient coupling to glass fibers. To produce switches or attenuators in $SiO_2$ waveguides, the thermo-optical effect is exploited, i.e. the dependency of the refractive index on the temperature (dn/dT). For this purpose, heating elements are applied to the surface of the planar light circuit and are deliberately used to heat individual waveguides, so that their refractive index can be increased.

The thermo-optical effect of $SiO_2$, at $dn/dT=10^{-5}$, is very low, however. Therefore, this entails the drawback that a high temperature change is required, and this in turn requires a high electrical heating power in order to effectively increase the refractive index. Therefore, the circuit elements used are usually interferometer structures, such as Mach-Zehnder interferometers, which react sensitively to very small changes in phase produced by temperature fields. However, switches and attenuators whose function is based on phase changes are highly polarization- and wavelength-dependent.

Furthermore, mode couplers wherein light of a basic mode is partially or completely converted (coupled) into higher modes and the light of the higher modes is removed from the signal are known for the purpose of switching and attenuating optical signals. The conversion of the basic mode into higher modes is brought about by an interference which is imparted to the waveguide and is in particular a refractive index grating.

In the $SiO_2$/Si system of materials, a refractive index grating can be produced, for example, by means of a heating electrode configuration which is applied to the waveguide layer. The resulting temperature fields, however, have only a slight temperature gradient in the waveguide plane. Therefore, on account of the low thermo-optical effect of $SiO_2$, the refractive index grating, which is proportional to the temperature grating, $$n(x,y,T)=dn/dT*T(x,y)+n_0(x,y)$$

is only weak. However, a strong refractive index grating is required for effective mode coupling. Hitherto, it has only been possible to achieve this by means of a high heating power.

SUMMARY OF THE INVENTION

It is accordingly an object of the invention to provide a refractive index grating and a mode coupler having a refractive index grating which overcome the above-mentioned disadvantages of the heretofore-known devices and methods of this general type and which have relatively high fluctuations in the refractive index even with a relatively low heating power of the heating elements of the grating.

With the foregoing and other objects in view there is provided, in accordance with the invention, a refractive index grating, comprising:
a wave-guiding structure;
a substrate adjoining the wave-guiding structure;
at least one configuration of heating elements on or adjacent the wave-guiding structure;
the wave-guiding structure and/or the substrate having regions formed therein with a changed characteristic, i.e., a thermo-optical coefficient of higher magnitude and/or a lower thermal conductivity relative to a structure surrounding the region; and
wherein substantially each of the heating elements is assigned at least one of the regions with a changed characteristic.

With the above and other objects in view there is also provided, in accordance with the invention, a mode coupler, comprising:
an input waveguide;
a mode expander adjoining the input waveguide;
a multimode mode coupling region connected to the mode expander;
a mode filter adjoining the mode coupling region;
an output waveguide connected to the mode filter; and
the refractive index grating as outlined above in the mode coupling region. The refractive index grating thereby forms a periodic perturbation (interference) for raising an energy of an input signal in the mode coupling region at least partially to higher modes.

In addition, the solution according to the invention is distinguished by the fact that regions are introduced into the wave-guiding structure and/or an adjoining substrate, which regions have a thermo-optical coefficient of higher magnitude or a lower thermal conductivity compared to the wave-guiding structure or the substrate, substantially each heating element being assigned at least one region with a thermo-optical coefficient of higher magnitude and/or at least one region with a lower thermal conductivity.

In a first aspect, therefore, the invention provides for the heating elements of the grating each to be assigned at least one region with a thermo-optical coefficient of higher magnitude compared to the surrounding area. The thermo-optical coefficient of higher magnitude leads to a defined temperature change in the region under consideration leading to a greater change (increase or decrease) in the refractive index. The refractive index grating is correspondingly stronger and has a high amplitude.

In a second aspect, the invention provides for the heating elements of the grating each to be assigned at least one region with a lower thermal conductivity compared to the surrounding area. The lower thermal conductivity means that the heat which is generated by a heating element flows away into adjoining regions to a lesser extent. The region of lower thermal conductivity to a certain extent forms a barrier to the flow of heat. As a result, the temperature gradient around the heating element and in the wave-guiding structure increases. Therefore, since the refractive index is dependent on the temperature, a more strongly pronounced refractive index grating is also provided.

The two aspects can also be combined, wherein case on the one hand regions with a higher thermo-optical coefficient and on the other hand regions with a lower thermal conductivity are provided.

It is preferable for the regions with a higher thermo-optical coefficient and/or the regions with a lower thermal conductivity to be arranged in such a manner with respect to the wave-guiding structure that a refractive index gradient is produced or amplified in the wave-guiding structure, transversely with respect to the direction of light propagation. This is achieved, for example, by the regions with a lower thermal conductivity being arranged only on one side of the wave-guiding structure and/or only partially above or below the wave-guiding structure. The same applies to the regions with a higher thermo-optical coefficient. The asymmetrical arrangement of the respective regions with respect to the wave-guiding structure leads to a temperature gradient or refractive index gradient transversely with respect to the direction of light propagation. Other asymmetrical arrangements of the respective regions may also be provided.

A refractive index gradient which is also transverse with respect to the direction of light propagation has the advantage that grating points of the refractive index grating are formed not only in the direction of propagation of the light (on account of the successively arranged heating elements), but also transversely with respect to the direction of propagation. As a result, grating points at which the light is additionally interfered with (alternately to the right and left) are created in particular when the heating elements are arranged alternately in two parallel rows. This in particular facilitates a transition to higher modes.

In a preferred configuration of the invention, the regions of lower thermal conductivity are in each case formed by an air gap. The air gap is introduced into the wave-guiding structure and/or an adjoining substrate in particular by etching, sawing or milling.

In an advantageous exemplary embodiment, it is provided that the wave-guiding structure is formed in a planar waveguide layer, and the air gap runs in the waveguide layer in an orientation which is perpendicular with respect thereto. The air gap in this case preferably extends from the surface of the waveguide layer to a defined depth or through the whole of the waveguide layer. However, it does not cut through the light-guiding core layer, in order not to interfere with propagation of light.

In particular, the air gap preferably runs parallel to the wave-guiding structure. This makes it possible to build up a temperature gradient in the waveguide in a transverse direction with respect to the longitudinal direction of the waveguide.

In a further preferred arrangement, the wave-guiding structure is formed in a planar waveguide layer which is arranged on a carrier substrate, and the air gap runs in the carrier substrate in an orientation which is perpendicular with respect to the waveguide layer. The air gaps or trenches are in this case formed in the carrier substrate on the underside of the waveguide layer. The air gaps are produced, for example, locally by etching techniques, preferably once again laterally offset with respect to the light-guiding core layer of the waveguide layer.

In this case too, the air gap preferably runs parallel to the wave-guiding structure in the carrier substrate and preferably only runs partially below the wave-guiding structure. This in turn makes it possible to build up a temperature gradient in the waveguide in a transverse direction with respect to the longitudinal direction of the waveguide.

In a third configuration, the wave-guiding structure is formed in a planar waveguide layer which is arranged on a carrier substrate. A first air gap is formed in the wave-guiding structure, and adjacent to this a second air gap is formed in the carrier substrate. The first air gap is produced, for example, by anisotropic etching from the surface of the waveguide layer to the carrier substrate. The second air gap in the carrier substrate is preferably produced adjacent to this by isotropic trench etching starting from the first air gap.

In an advantageous configuration of the invention, it is provided that the regions with a higher thermo-optical coefficient are in each case formed by a polymer region. Polymers are distinguished by a high thermo-optical coefficient. They are eminently suitable as materials for planar optical components.

The wave-guiding structure is preferably formed in a planar waveguide layer. The regions with a higher thermo-optical coefficient, which are formed in particular by polymers, are then introduced into the planar waveguide layer. The heating elements are preferably formed by heating electrodes which are arranged on the planar waveguide layer and on the regions with a higher thermo-optical coefficient.

It is preferably provided that the regions with a higher thermo-optical coefficient each extend as far as close to the light-guiding core layer of the waveguide layer, but do not interrupt it. This is because substituting another material for the material of the waveguide core would lead to undesirable waveguide losses. Since the optical signal is almost exclusively concentrated on the waveguide core, it is preferable for material with a higher thermo-optical coefficient to be introduced only locally in the surface of the waveguide layer or also laterally next to the waveguide core. Since signal components (even if only minor ones) always also run outside the waveguide core, the light wave is nevertheless influenced by the refractive index grating and is excited, for example, to form higher modes.

In a further preferred configuration, the regions with a higher thermo-optical coefficient, at least in a temperature range between 0° C. and 250° C., can be set to a refractive index which substantially corresponds to the refractive index of the surrounding material. For this specific case, the regions with a higher thermo-optical coefficient are optically invisible. It is therefore possible for the refractive index grating to be "switched on and off."

In an advantageous exemplary embodiment, the heating elements and the regions with a higher thermo-optical coefficient or a lower thermal conductivity are arranged in two spaced-apart rows and in each case offset with respect to one another. In this way, the distance between the individual grating points can be reduced.

Furthermore, it is preferably provided that the refractive index grating is produced on a planar optical component, the heating elements being arranged on the flat surface of the planar optical component. In particular, the planar optical component is made from the materials system $SiO_2$ on Si, a planar $SiO_2$ covering layer with a light-guiding $SiO_2$ core layer being arranged on an Si carrier substrate, and the regions with a higher thermo-optical coefficient or a lower thermal conductivity being formed in the $SiO_2$ covering layer and/or the Si carrier substrate. However, the invention may also be applied to other systems of materials, such as InP, GaAlAs, GaAs, systems which include lithium niobate ($LiNbO_3$) and in systems with polymers (acrylates, polyimides, polycarbonates and ormocers).

In principle, it is also possible for the refractive index grating to be formed in structures other than planar optical components, for example in fibers which form a Bragg grating.

The heating elements of the refractive index grating are preferably arranged periodically. Accordingly, the associated regions with a higher thermo-optical coefficient or a lower thermal conductivity are also arranged periodically, and therefore the result is a periodic refractive index grating.

In this context, it is pointed out that in the context of the present invention a periodic arrangement of the heating elements of the grating or of the associated regions is understood as meaning all arrangements wherein the heating elements are at a constant distance from one another or wherein the distance between the heating elements changes within a defined functional relationship, in particular in linear or quadratic fashion. Therefore, the term "periodic arrangement" also encompasses gratings with a chirp. The term is also intended to encompass what are known as quasi-periodic gratings.

The mode coupler according to the invention includes the following elements:
- an input waveguide,
- an adjoining mode expander,
- a multimode mode coupling region, which is connected to the mode expander,
- a mode filter, which adjoins the mode coupling region,
- an output waveguide, and
- an interference provided in the mode coupling region.

On account of the interference, the energy of an input signal in the mode coupling region is at least partially transferred to higher modes. According to the invention, the interference is formed by a refractive index grating according to claim 1.

The input waveguide and the output waveguide are preferably of monomodal design. A monomodal lightwave which is introduced is preferably adiabatically expanded in the mode expander, i.e. it initially retains its monomodal property. On account of the interference from the refractive index grating, the lightwave is then at least partially converted into higher modes in the mode coupling region. This takes place highly effectively even with a low heating power, on account of the inventive design of the refractive index grating. The transfer to the monomodal output waveguide is provided by the mode filter, which only allows the basic mode to pass through. The light signal is thereby attenuated or—if all the light energy has been converted into higher modes—is completely extinguished. The degree of mode conversion is fixed adjustably by the heating power and therefore the amplitude of the refractive index grating.

A preferred use of a mode coupler according to the invention consists in its use for an optical attenuator device or for an optical switch, the signals of an optical data channel each being attenuated or filtered out in a defined way by a mode coupler according to the invention in the attenuator arrangement or the optical switch. Signal attenuation or signal extinction takes place depending on whether the signals are only partially transferred or are completely transferred into higher modes in the mode coupling region.

Other features which are considered as characteristic for the invention are set forth in the appended claims.

Although the invention is illustrated and described herein as embodied in a refractive index grating, and mode coupler having a refractive index grating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5A is an illustration of a first exemplary embodiment of a mode coupler with a refractive index grating, air gaps having been introduced into the carrier substrate;

FIG. 5B is a section through the exemplary embodiment of FIG. 5A taken along the line V—V;

DESCRIPTION OF THE PREFERRED EMBODIMENTS

Figure 4:
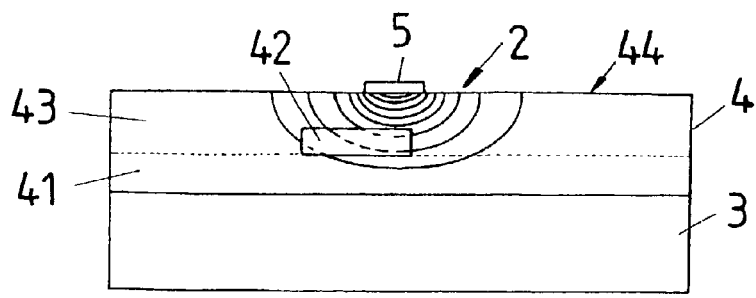
FIG. 4 is a schematic sectional view of a refractive index grating which has been formed on a planar optical component in accordance with the prior art, and showing the associated temperature distribution.

Referring now to the figures of the drawing in detail and first, particularly, to FIG. 4 thereof, there is shown a planar optical component having a refractive index grating 2 in accordance with the prior art. The planar optical component is, for example, part of a planar light circuit. It comprises a carrier substrate 3 made from silicon, which is adjoined by a planar waveguide layer 4 comprising three layers. The individual layers are a buffer layer 41, a core layer 42 and a covering layer 43. The layers 41, 42, 43 all consist of $SiO_2$. The core layer 42 forms the waveguide core and has a different refractive index than the buffer layer 41 and the covering layer 43. The buffer layer 41 ensures that the wave-carrying core layer 42 does not directly adjoin the carrier substrate 3.

Wherever the following text refers to the covering layer 43, this is intended to encompass both the covering layer 43 and the buffer layer 41 but the two terms are not repeated in order to avoid prolixity.

A heating electrode 5, which forms part of the refractive index grating 2, is applied to the surface 44 of the waveguide layer 4. Current passes through the heating electrode 5, so that the latter generates a heat output, which propagates into the waveguide layer 4 and into the light-guiding core region 42. At the same time, the heat is dissipated by known heat-conduction mechanisms. The temperature distribution illustrated in FIG. 4 is developed. The temperature is approx. 110° C. directly at the heating electrode 5 and drops in 10° steps to the ambient temperature of approximately 20° C.

Each "contour line" or isotherm corresponds to a temperature change of approx. 10° C.

The horizontal temperature gradient in the waveguide core 42 is approx. 15° C. On account of the periodically arranged heating electrodes 5, the temperature in the light-guiding core layer 42 periodically changes by this amount. The associated change in the refractive index or the amplitude of the refractive index grating 2 is low.

In the illustrated example, the heating output is 600 mW. The width of the waveguide 4 is approx. 50 μm. The above-mentioned heating output and width of the waveguide core are also present in FIGS. 1 to 3, which are explained below.

Figure 1:
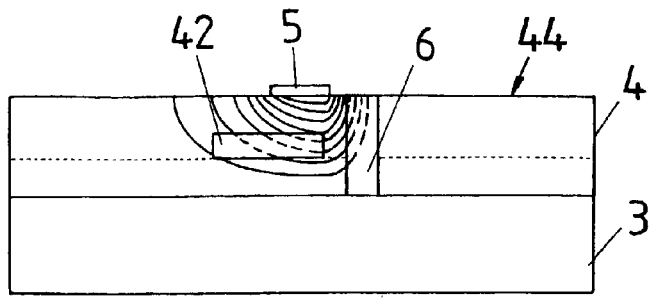
FIG. 1 is a schematic sectional view of a first exemplary embodiment of a refractive index grating which is formed on a planar optical component, an air gap having been introduced into the waveguide layer, and showing the associated temperature distribution.

In the exemplary embodiment shown in FIG. 1, an air gap 6, which is also referred to below as trench 6, which extends perpendicular to the surface 44 and parallel to the core layer 42, is introduced into the covering layer 13. The trench 6 runs on one side of the core layer or the waveguide core 42 all the way to the carrier substrate 3. It is introduced, for example, by anisotropic etching or sawing. On one side of the waveguide core 42, the trench 6 suppresses the flow of heat in the waveguide layer 4. The temperature directly at the heating electrode 5 is now approximately 140° C. The horizontal temperature gradient (transversely to the direction of light propagation) in the waveguide core 42 increases from 15° C. to 30° C.

This means that the grating amplitude of the refractive index grating 2 is greater, or the same grating amplitude as in the configuration shown in FIG. 4 can be achieved with less than 50% of the switching power. The lateral temperature distribution is optimized by the arrangement of the trench 6 on one side in the waveguide layer 4.

In the exemplary embodiment shown in FIG. 2, trenches 7 are formed in the Si carrier substrate 3 below the waveguide layer 2. The thermal conductivity of silicon is approximately 100 times greater than that of $SiO_2$. Therefore, the substrate 3 is an ideal heat sink. In accordance with FIG. 2, the flow of heat into the Si heat sink 3 is locally disrupted by the trenches 7, so that the horizontal temperature gradient in the waveguide increases. The temperature immediately at the heating electrode 5 is now approximately 115° C.

To produce the trench 7, the substrate 3 may, for example, be locally removed, by means of etching techniques, laterally offset below the waveguide core 42. The local removal of the substrate 3 may be effected, for example, by photolithographically defining an etching mask on the underside 31 of the substrate 3 and removing the substrate 3 on the back surface, by means of etching techniques, as far as the waveguide layer 4 consisting of $SiO_2$. Since $SiO_2$ and Si are chemically different, a natural etching stop is obtained. The etchant used is, for example, potassium hydroxide. Reactive ion etching (RIE) may also be used for example.

Figure 2:
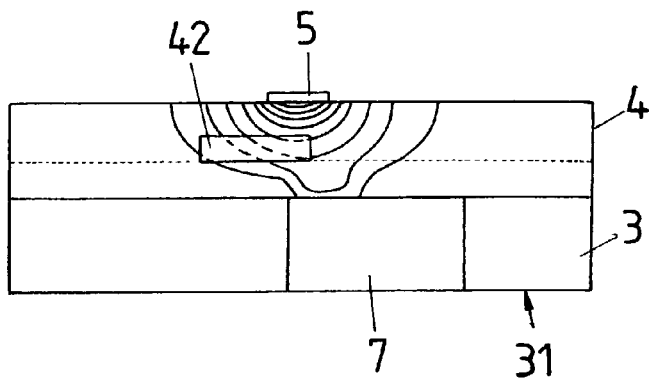
FIG. 2 is a schematic sectional view of a second exemplary embodiment of a refractive index grating which has been formed on a planar optical component, an air gap having been introduced into the carrier substrate, and showing the associated temperature distribution.

It has been found that in the configuration shown in FIG. 2, the horizontal temperature gradient in the waveguide core 42 rises from 15° C. to 25° C. for the same heating output. This means that the heating output can be reduced by 40%.

In this context, it should be noted that the trench runs only partially below the waveguide core 42. As a result, the horizontal temperature gradient transversely with respect to the longitudinal direction of the waveguide core 42 or transversely with respect to the direction of light propagation is increased.

Figure 3:
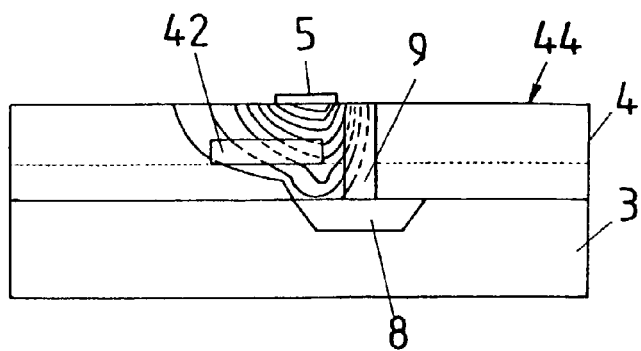
FIG. 3 is a schematic sectional view of a third exemplary embodiment of a refractive index grating which has been formed on a planar optical component, an air gap having been introduced both into the waveguide layer and into the carrier substrate, and showing the associated temperature distribution.

FIG. 3 illustrates an exemplary embodiment wherein air gaps or trenches are provided both in the waveguide layer 4 and in the carrier substrate 3. Therefore, a lateral trench 8 in the Si substrate 3 below the waveguide layer 4 and a vertical trench 9 in the waveguide layer 4 are formed. The trench 8 in the Si substrate 3 runs only partially below the waveguide core.

To produce the trenches 8, 9, an etching mask is photolithographically defined on the surface 44 of the $SiO_2$ waveguide layer 4, and first of all steep trenches 9 are etched anisotropically into the $SiO_2$ waveguide layer 4 as far as the substrate 3. When the substrate 3 is reached, the etching medium is changed and the trench etching in the substrate 3 is continued isotropically in order to form the trenches 8. This leads to undercut etching of the waveguide layer 4.

It can be seen that in this configuration the horizontal temperature gradient in the waveguide core 42 can be increased from 15° C. to approximately 50° C. for the same heating output. The temperature directly at the heating electrode 5 is approximately 155° C. Less than 70% of the heating output is required.

FIGS. 5A and 5B show a mode coupler 10 which has a monomodal input waveguide 11, a mode expander 12, a multimodal mode coupling region 13, a mode filter or mode reducer 14, and a monomodal output waveguide 15.

In the mode coupling region 13, there is a periodic arrangement of heating elements 5 on the surface 44 of the waveguide layer 4. To this extent, reference is had to the explanations made above. The heating electrodes 5 each have two supply conductors 51, 52 for electrical connections. Furthermore, as shown in FIG. 2, trenches 7 have been periodically introduced into the carrier substrate 3, reducing a flow of heat into the carrier substrate 3.

The heating elements 5 are arranged in two longitudinal rows and are offset with respect to one another. They define grating points of a refractive index grating which is formed in the mode coupling region 13 in the waveguide layer 4 on account of the change in the refractive index caused by the temperature change. On account of a temperature gradient, which also runs transversely with respect to the direction of light propagation, in addition to grating points in the direction of propagation there are also grating points located transversely with respect thereto.

The width of the input waveguide 11 is selected in such a way that it can only carry one mode. The input waveguide 11 is expanded in the mode expander 12 to a sufficient extent for the waveguide to be able to carry at least two modes. In the adjoining mode coupling region 13, the waveguide width remains constant for a few millimeters and is then reduced again in the mode filter 14. The output waveguide 15 can once again only carry one mode. Therefore, in the transition from the mode coupling region 13 to the output waveguide 14, the mode filter 14 only allows the basic mode to pass.

If light is then introduced into the input waveguide 11, the field distribution of the input mode in the mode expander 12 is expanded adiabatically until it corresponds to the field distribution of the basic mode in the wider mode coupling region 13. As a result of the periodic refractive index grating, the refractive index difference of which can be set in the covering layer 43 by means of the heating elements 5, the light which is guided in the basic mode is subject to periodic interference in the mode coupling region 13. Given a suitable grating period, this interference causes energy of the light to be transferred from the basic mode into the next mode up or even, if the waveguide carries further modes, into further, higher modes.

The transfer of energy is dependent on the extent of the interference, i.e. the difference in refractive index in the waveguide layer 4, in particular in the wave-guiding core 42, and can be set by means of the heating electrodes 5. The more sudden the jumps in refractive index or the steeper the amplitudes of the refractive index grating, the more effective the interference becomes.

After it has passed through the mode coupling region 13, the light is partially or completely in higher modes. The light which is no longer in the basic mode is irradiated into the mode filter 14 during the subsequent narrowing of the waveguide, since the output waveguide 15 can only carry the basic mode. Therefore, the light in the output waveguide 15 has been attenuated. The attenuation can be controlled by means of the heating electrodes 5.

Figure 6A:
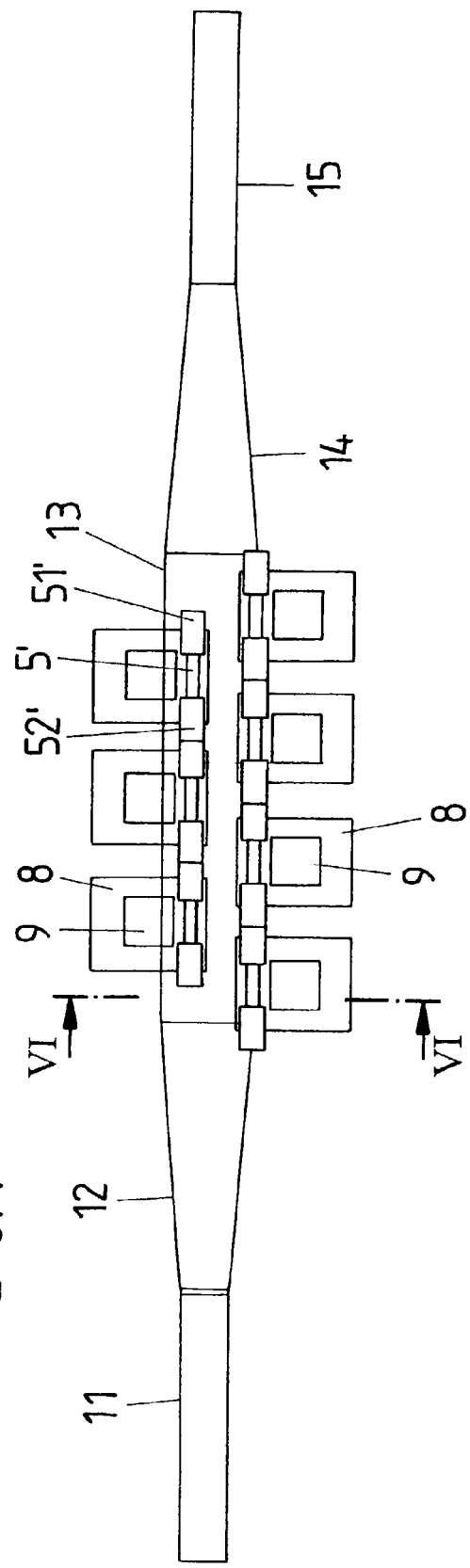
FIG. 6A is an illustration of a second exemplary embodiment of a mode coupler having a refractive index grating, air gaps having been introduced into the carrier substrate and the waveguide layer.
Figure 6B:
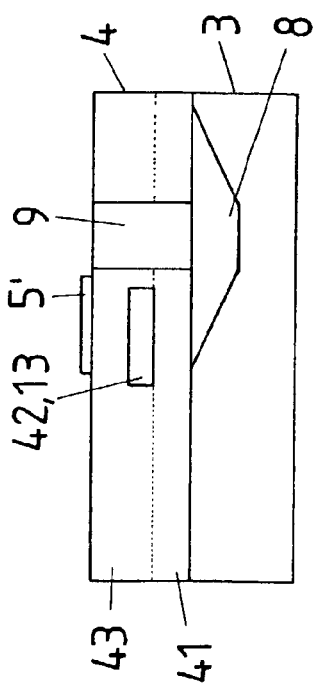
FIG. 6B is a section through the exemplary embodiment of FIG. 6A taken along the line VI—VI.

FIGS. 6A and 6B illustrate an exemplary embodiment of a mode coupler wherein trenches 8, 9 as described with reference to FIG. 3 have been formed both in the waveguide layer 4 and in the carrier substrate 3. The trenches 9 in the waveguide layer and the trenches or the undercut etching 8 in the Si substrate are clearly visible in the illustration presented in FIG. 6A. Both are substantially square.

In this exemplary embodiment, the heating electrodes 5' and the supply conductors 51', 52' are arranged one behind the other in the longitudinal direction of the mode coupling region 13.

It should be noted that in the plan view shown in FIG. 6A, to simplify illustration of the waveguide layer in each case only the signal-guiding core layer 11, 12, 13, 14, 15 is specifically illustrated (in the sectional view shown in FIG. 6B: only core layer 42, 14), but the covering layer surrounding the core layer is not illustrated. The same is true of FIGS. 5A and 7A.

As shown in FIG. 3, the core layer 42, 13 has a temperature gradient which also extends transversely with respect to the longitudinal direction. Therefore, at the right-hand edge, which is adjacent to the trenches 8, 9, the core layer 42, 13 is at a higher temperature than at its left-hand edge. The trench 8, which runs in the carrier substrate 3, runs only partially below the core layer 42, 13, in order to achieve a high temperature gradient.

Figure 7A:
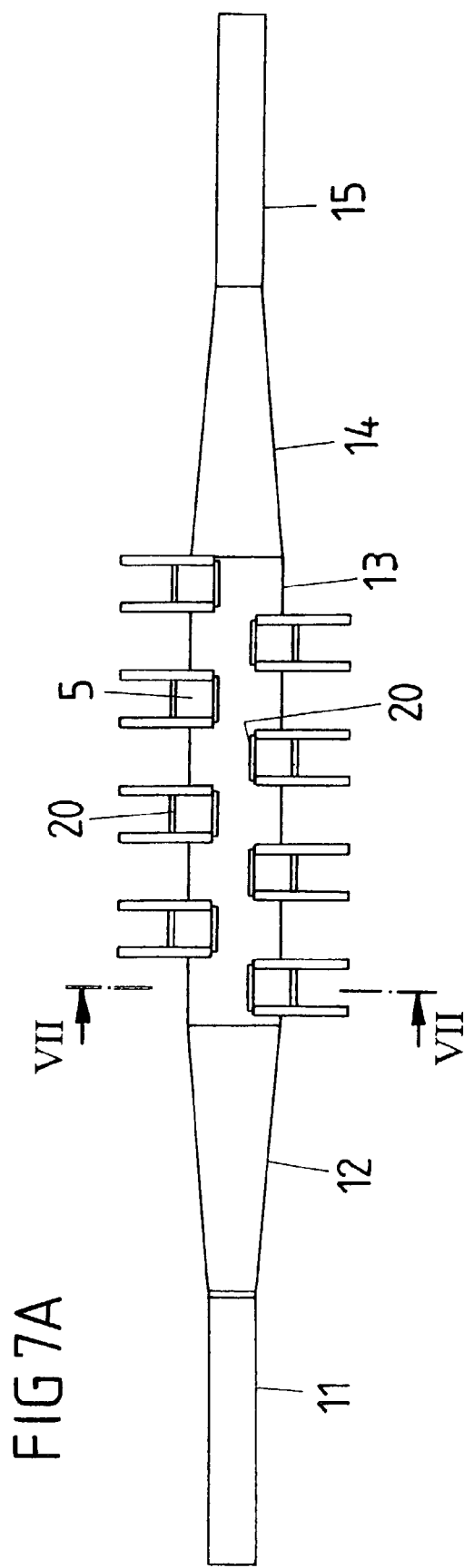
FIG. 7A is an illustration of a third exemplary embodiment of a mode coupler having a refractive index grating, polymer regions with a higher thermo-optical coefficient having been introduced into the waveguide layer.
Figure 7B:
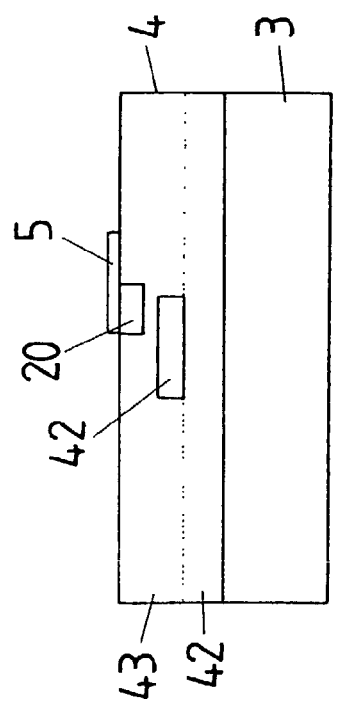
FIG. 7B is a section through the exemplary embodiment of FIG. 7A taken along the line VII—VII.

FIGS. 7A and 7B show an alternative configuration of a mode coupler, wherein air gaps or trenches have been dispensed with and, in order to increase the amplitude of the refractive index grating, polymer regions 20 with a higher thermo-optical coefficient have been integrated in the SiO$_2$ waveguide layer instead.

The material SiO$_2$ has a low thermo-optical coefficient. If regions in the SiO$_2$ waveguide layer 4 are locally replaced by a wave-guiding material with a thermo-optical coefficient of higher magnitude, a suitably located refractive index grating with a high amplitude is formed automatically when the temperature is increased.

However, substituting a different material for SiO$_2$ may lead to waveguide losses. Since the optical signal is almost exclusively concentrated on the waveguide core 42, these additional losses are avoided if material with a higher thermo-optical coefficient is only locally incorporated in the waveguide covering layer 43 or is also locally incorporated laterally next to the waveguide core 42. Since the light signal is also guided outside the waveguide core 42, it nevertheless undergoes a signal change.

To incorporate a material with a higher thermo-optical coefficient, by way of example those regions into which the material is to be introduced are defined photolithographically, and in these regions the SiO$_2$ covering layer 43 is removed as far as close to the core layer 42. The regions in question are then filled with a polymer by means of spin-on techniques. Then, heating electrodes 5 are formed on the polymers by means of thin-film techniques and photolithography.

If the heating electrodes 5 are operated, although the result once again is unfavorable, weakly localized temperature distribution, since polymers and SiO$_2$ under certain circumstances have a similar thermal conductivity, polymers react to the temperature field with a change in refractive index which is up to a hundred times that of SiO$_2$. Therefore, despite a temperature distribution which is not sharply defined, the result is a localized refractive index grating with a high amplitude, which is very efficient for mode coupling. This high-amplitude refractive index grating preferably extends as far as close to the core layer 42 and presents a periodic interference which may lead to a mode transfer. Depending on the material selected, the heating output can be reduced to as little as $\frac{1}{100}^{th}$ of the standard heating output.

FIGS. 7A, 7B show the mode coupler with heating electrodes 5 and polymer regions 20. In the mode coupling region 13, the polymer regions 20 are periodically incorporated in the covering layer 43. They have a thermo-optical coefficient which is higher than that of the covering layer 43. Moreover, the refractive index of the polymer at one point in the temperature range between 0° C. and 250° C. corresponds to the refractive index of the covering layer. For this situation, the interference produced by the polymer regions 20 is optically nonexistent. Consequently, the interference can be switched on and off.

The heating electrodes 5 are, for example, thin-film heaters made from chromium, titanium, or nickel.

In this variant of the invention, there are no trenches, although in principle trenches may be provided as an additional measure. The arrangement of the mode coupler otherwise corresponds to the arrangement shown in FIGS. 5 and 6.

It should be noted that the polymer regions 20 and the heating elements 5 may alternatively also be arranged diagonally (obliquely, at angles) or in some other configuration above the waveguide.

Furthermore, it should be noted that the polymer regions 20 shown in FIG. 7B are in each case only arranged above a part of the waveguide core 42 (in FIG. 7B above the right-hand part). This asymmetry leads to a refractive index gradient in a transverse direction with respect to the longitudinal direction of the waveguide core 42. In accordance with FIG. 7A, the polymer regions 20 and heating elements 5 are arranged in two rows. In each row, the refractive index gradient runs in a different direction, so that the light which propagates in the waveguide core 42 is alternately subject to interference from the right and the left, and therefore is to a certain extent made to sway to and fro.

With regard to the way wherein the configuration functions, reference is had first of all to the explanations given in connection with FIG. 5. In addition, the following is pointed out. If the temperature of the polymer regions 20 has been set by means of the heating electrodes 5 in such a way that the polymer regions 20 and covering layer 43 have the same refractive index, there is no attenuation. The light is adiabatically expanded in the mode expander 12 and is narrowed again at the mode filter 14. There is no transfer of energy into the second mode, provided that the waveguide is not subject to any interference and the system is of symmetrical construction. The input field can therefore pass through the mode coupler without interference. There is at most a slight attenuation on account of waveguide losses.

For variable attenuation, the temperature of the polymer regions 20 is set in such a way that the polymer regions 20 and the covering layer 43 have a difference in refractive index. On account of the periodically arranged polymer regions 20, the light which is guided in the basic mode of the wide waveguide is subject to periodic interference. As has been described, this interference causes a transfer of energy from the light from the basic mode into the next mode up or even into further, higher modes. The transfer of energy is dependent on the strength of the interference, namely the difference in refractive index between the covering layer 43 and polymer, and can be set by means of the heating electrodes 5.

The jumps in refractive index that are achieved are very pronounced, since the refractive index of the polymer material reacts more strongly to a temperature change than the covering layer 43.

The polymer materials used are, for example, PMMA, PMA, PDDA or inorganic hybrid polymers (ormocers). In one exemplary embodiment, the polymer used is a polymer marketed by The Dow Chemical Company under the name Cyclotene®.

Attenuations of up to 60 dB are possible in all the configurations which have been described, given an optimum arrangement of the polymer regions and/or the trenches and an optimum heating output.

I claim:

1. A refractive index grating, comprising:
   a wave-guiding structure;
   a substrate adjoining said wave-guiding structure;
   at least one configuration of heating elements on or adjacent said wave-guiding structure, said at least one configuration of heating elements forming a grating;
   at least one of said wave-guiding structure and said substrate having regions formed therein with a lower thermal conductivity relative to a structure surrounding said region; and
   wherein substantially each of said heating elements is assigned at least one said region with a lower thermal conductivity.

2. The refractive index grating according to claim 1, wherein said regions of lower thermal conductivity are in each case formed by an air gap.

3. The refractive index grating according to claim 2, wherein said wave-guiding structure is formed in a planar waveguide layer, and said air gap extends in said waveguide layer in an orientation substantially perpendicular thereto.

4. The refractive index grating according to claim 2, which further comprises a carrier substrate supporting said substrate and said wave-guiding structure, and wherein said wave-guiding structure is formed in a planar waveguide layer arranged on said carrier substrate, and said air gap runs in said carrier substrate in an orientation substantially perpendicular with respect to said waveguide layer.

5. The refractive index grating according to claim 2, wherein said wave-guiding structure is formed in a planar waveguide layer disposed on a carrier substrate, said wave-guiding layer having a first air gap formed therein and said carrier substrate having a second air gap formed therein adjacent said first air gap.

6. The refractive index grating according to claim 5, wherein said second air gap in said carrier substrate is an etched trench formed by isotropic trench etching starting from said first air gap.

7. The refractive index grating according to claim 1, wherein the heating elements and said regions with the lower thermal conductivity are disposed in two spaced-apart rows and in each case offset with respect to one another.

8. A refractive index grating assembly, comprising a planar optical component having a flat surface, and the refractive index grating according to claim 1 formed on said planar optical component, with said heating elements disposed on the flat surface of said planar optical component.

9. The refractive index grating assembly according to claim 8, wherein said planar optical component is formed of a materials system $SiO_2$ on Si, including a planar $SiO_2$ covering layer with a light-guiding $SiO_2$ core layer formed on an Si carrier substrate, and said regions with the lower thermal conductivity are formed in at least one of said $SiO_2$ covering layer and said Si carrier substrate.

10. The refractive index grating according to claim 1, wherein the heating elements are periodically arranged heating elements.

11. The refractive index grating according to claim 1, wherein said regions with the lower thermal conductivity are arranged, relative to said wave-guiding structure, to produce or amplify a refractive index gradient in said wave-guiding structure transversely with respect to a direction of light propagation.

12. The refractive index grating according to claim 11, wherein said regions with the lower thermal conductivity are formed in at least one location selected from the group consisting of laterally on one side of said wave-guiding structure, only partially above said wave-guiding structure, and only partially below said wave-guiding structure.

13. A refractive index grating, comprising:
   a wave-guiding structure;
   a substrate adjoining said wave-guiding structure;
   at least one configuration of heating elements on or adjacent said wave-guiding structure;
   at least one of said wave-guiding structure and said substrate having regions formed therein with a changed characteristic selected from the group consisting of a thermo-optical coefficient of higher magnitude and a lower thermal conductivity relative to a structure surrounding said region;
   substantially each of said heating elements being assigned at least one said region with a changed characteristic;
   said regions with the changed characteristic being arranged, relative to said wave-guiding structure, to produce or amplify a refractive index gradient in said wave-guiding structure transversely with respect to a direction of light propagation;
   said regions with the higher thermo-optical coefficient are formed in at least one location selected from the group consisting of laterally on one side of said wave-guiding structure, only partially above said wave-guiding structure, and only partially below said wave-guiding structure.

14. A mode coupler, comprising:
   an input waveguide;
   a mode expander adjoining said input waveguide;
   a multimode mode coupling region connected to said mode expander;
   a mode filter adjoining said mode coupling region;
   an output waveguide connected to said mode filter; and
   a refractive index grating in said mode coupling region, said refractive index grating including:
      a wave-guiding structure;
      a substrate adjoining said wave-guiding structure;
      at least one configuration of heating elements on or adjacent said wave-guiding structure;
      at least one of said wave-guiding structure and said substrate having regions formed therein with a changed characteristic selected from the group consisting of a thermo-optical coefficient of higher magnitude and a lower thermal conductivity relative to a structure surrounding said region; and substantially each of said heating elements being assigned at least one said region with a changed characteristic;

said refractive index grating forming a periodic perturbation for raising an energy of an input signal in the mode coupling region at least partially to higher modes.

15. The mode coupler according to claim 14, wherein said input waveguide and said output waveguide are monomodal waveguides.

16. The mode coupler according to claim 14, wherein a field of said input waveguide is expanded adiabatically in said mode expander.

17. The mode coupler according to claim 14, wherein said mode coupler is a planar light circuit.

18. The refractive index grating according to claim 1, wherein only said wave-guiding structure includes said regions with a lower thermal conductivity.

* * * * *